United States Patent [19]

Schmitt

[11] 4,363,206

[45] Dec. 14, 1982

[54] METHOD AND APPARATUS FOR CONTROLLING BLADE CLUTCH ASSEMBLY

[75] Inventor: Larry D. Schmitt, Newton, Kans.

[73] Assignee: Conchemco Incorporated, Lenexa, Kans.

[21] Appl. No.: 256,902

[22] Filed: Apr. 23, 1981

[51] Int. Cl.$^3$ ............................................. A01D 50/02
[52] U.S. Cl. ...................................... 56/11.3; 56/11.8; 74/483 R; 192/99 S
[58] Field of Search .............................. 56/11.3, 11.8; 192/99 S; 74/477, 483 R; 180/19 H, 272, 273

[56] References Cited

U.S. PATENT DOCUMENTS

| | | | |
|---|---|---|---|
| 4,212,141 | 7/1980 | Miyazawa | 56/11.8 |
| 4,230,200 | 10/1980 | Carolan | 192/99 S |
| 4,281,732 | 8/1981 | Hoch | 56/11.8 |
| 4,295,326 | 10/1981 | Green | 56/11.3 |

*Primary Examiner*—Robert A. Hafer
*Attorney, Agent, or Firm*—Schmidt, Johnson, Hovey & Williams

[57] ABSTRACT

A compact safety control apparatus and method for powered lawnmowers having a cable-actuated clutch between the motor and blade thereof is provided which includes a "dead man" function along with an operating mechanism requiring two distinct steps for engaging the clutch and initiating rotation of the lawnmower blade. The control apparatus preferably comprises a shiftable lever and a separate, shiftable "dead man" bail, along with an operating mechanism including a coupler positioned on the lever and movable into engagement with an end fitting on the actuating cable by means of a plate shiftable with the bail; when the coupler is initially positioned by movement of the bail, the lever is shifted to move the cable and thereby engage the clutch, whereupon the cable is releasably locked in position by interengagement of respective shoulders on the cable fitting and plate. Subsequent release of the bail releases the locking shoulders, thereby disengaging the clutch.

8 Claims, 7 Drawing Figures

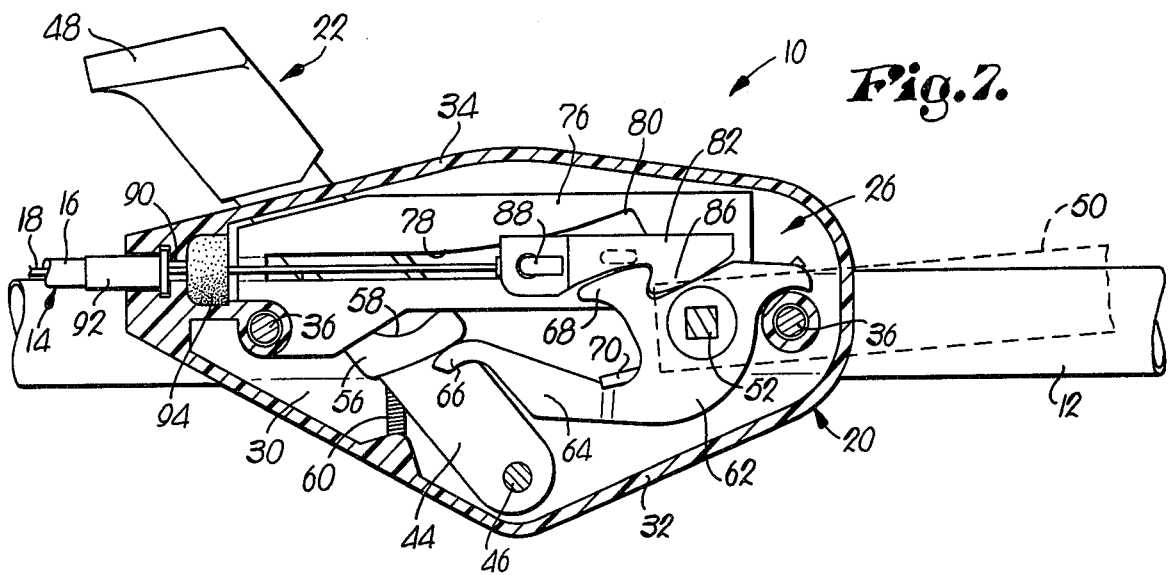
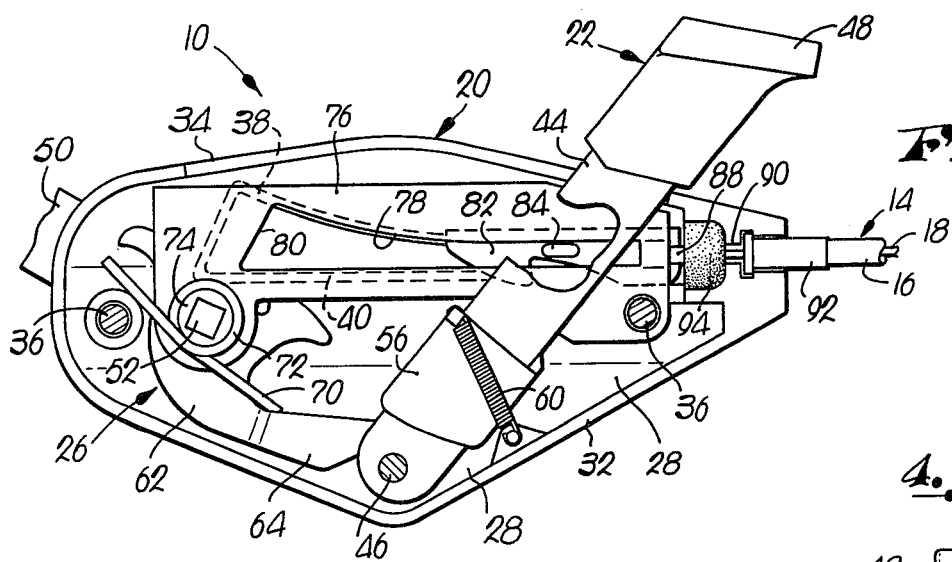
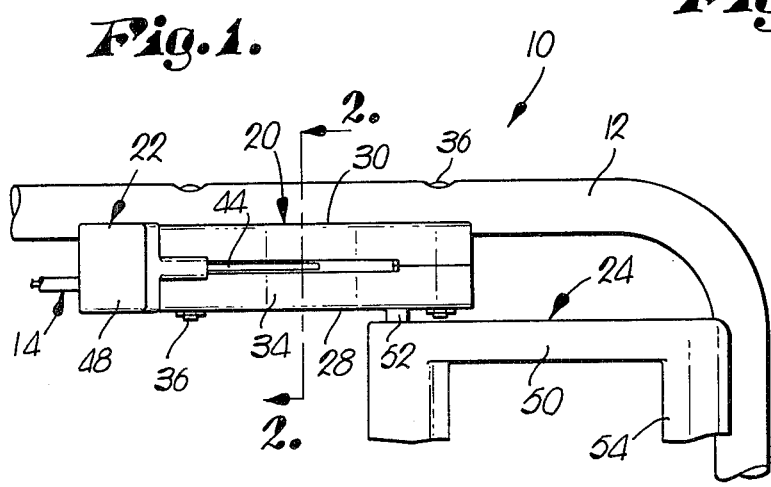
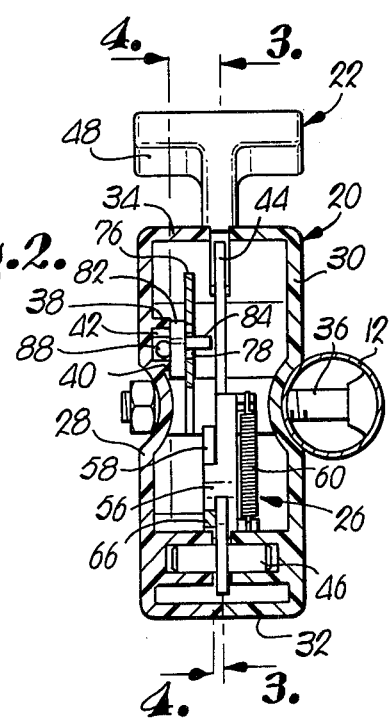

METHOD AND APPARATUS FOR CONTROLLING BLADE CLUTCH ASSEMBLY

BACKGROUND OF THE INVENTION

1. Field of the Invention

The present invention is concerned with an improved control apparatus and method for use on walk-behind lawnmowers of the type having a clutch interposed between the motor and blade thereof, and with an elongated cable for clutch operation. More particularly, it is concerned with such a control apparatus and method which provides a desirable "dead man" function, along with a two step procedure for engaging the clutch and initiating blade rotation.

2. Description of the Prior Art

So-called walk-behind rotary powered mowers are well known and in widespread use. Generally speaking, such mowers include a lowermost housing supported on spaced wheels, with a gasoline powered engine coupled to a rotary mower blade disposed within the housing. An elongated handle is affixed to the housing at the rear thereof, so that the user simply pushes the mower in a "walk-behind" fashion.

In recent years the government has promulgated a number of safety regulations relating to mowers of the type described. For example, such mowers must now be equipped with a so-called "dead man" switch which generally includes a spring-biased bail or other handle which is grasped by the operator during normal operation of the mower. If the bail is thereafter released, mowing action is rapidly terminated for reasons of safety. Such termination may be by way of stopping the motor, or through a clutch mechanism operatively coupled with the bail which disengages the blade from the motor when the bail is released.

In addition, it has now been proposed that walk-behind mowers be provided with a control apparatus requiring two distinct actions to restart the rotary blade thereof when it has ceased operation.

In view of these regulations, there has been considerable effort on the part of mower manufacturers and suppliers to develop a low cost, compact, reliable and easy to use control apparatus which meets the new regulations

SUMMARY OF THE INVENTION

The present invention relates to a control apparatus for walk-behind mowers which satisfies all presently existing and proposed safety standards. Broadly speaking, the apparatus hereof includes first and second shiftable handle means along with an operating mechanism including a shiftable coupler movable to a position where the first handle means is coupled to the clutch-actuating cable of the mower, along with structure associated with the second handle means for shifting the coupler to the operative position thereof in response to shifting of the second handle means.

In practice, the second handle means preferably comprises a pivotally mounted, graspable bail which is coupled to an internal operating plate. The plate includes an elongated finger which is oriented such that, upon pivoting of the bail, the coupler (which preferably is shiftable along the length of a pivotal lever) is moved into a position for engagement with a fitting on the clutch-actuating cable. When the coupler is thus positioned, the lever is shifted so as to correspondingly shift the cable and engage the mower clutch. The cable fitting is releasably locked in its shifted relation by means of respective, inter-engageable shoulders on the cable fitting and operating plate. In the event that the bail is subsequently released by the user, the plate (which is spring biased) shifts out of engagement with the cable end fitting, whereupon the cable shifts back and disengages the mower clutch.

BRIEF DESCRIPTION OF THE DRAWINGS

FIG. 1 is a fragmentary top view illustrating the control apparatus of the present invention, operatively mounted on the main handle of a walk-behind powered lawnmower;

FIG. 2 is a sectional view taken along line 2—2 of FIG. 1;

FIG. 3 is a vertical sectional view taken along line 3—3 of FIG. 2 and with parts broken away for clarity;

FIG. 7 is a view similar to FIG. 6, but depicting the operating lever shifted back to its initial position, and with the clutch-actuating cable locked in a position corresponding to engagement of the mower clutch.

DESCRIPTION OF THE PREFERRED EMBODIMENT

Figure 4:
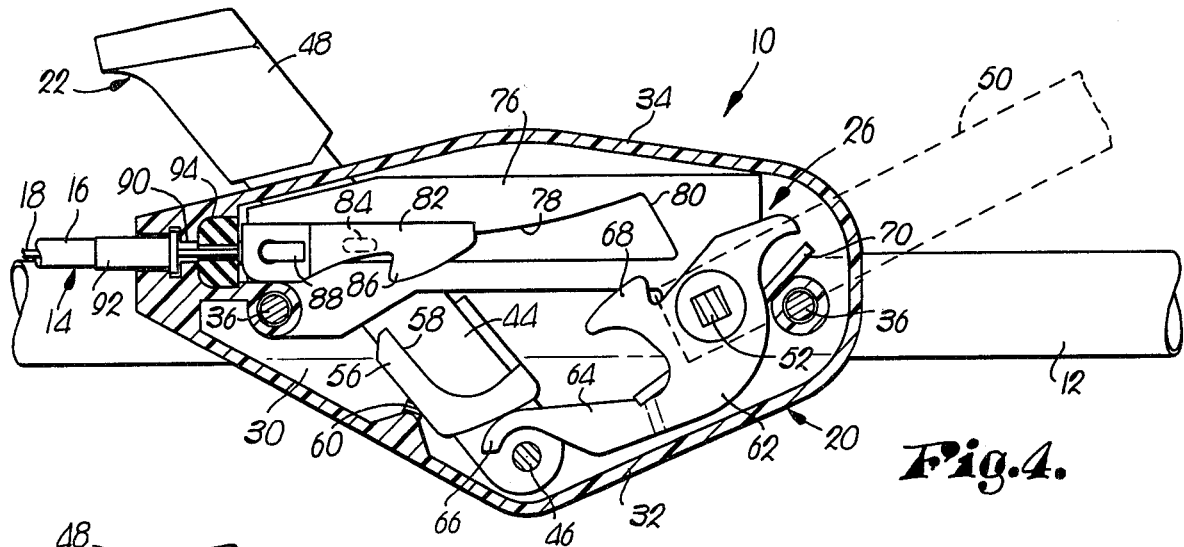
FIG. 4 is a vertical sectional view taken along line 4—4 of FIG. 2, with the position of the bail member being depicted in phantom.

Turning now to the drawings, a control apparatus 10 is depicted as it would appear when operatively mounted on the U-shaped main handle 12 of a walk-behind powered lawnmower. A clutch-actuating cable 14 extends from apparatus 10 and is operatively connected to a conventional clutch unit coupled between the lawnmower motor and the rotary blade thereof (not shown). Cable 14 is likewise of conventional construction, and includes an outer casing 16, and an internal, longitudinally shiftable metallic element 18.

Control apparatus 10 broadly includes a housing 20, first and second shiftable handle means 22 and 24, and operating mechanism broadly referred to by the numeral 26 located within housing 20 and serving to couple the handles 22, 24, and cable 14, in a manner to be described.

In more detail, housing 20 includes a pair of spaced apart, irregularly shaped sidewalls 28, 30, a bottom wall 32, and a slotted top wall 34. The housing 20 is advantageously formed of an appropriate synthetic resin material, and is coupled to handle 12 by means of appropriate bolts or other fasteners 36 extending through the main handle 12 and the sidewlls 28, 30

In addition (see FIG. 2), the sidewall 28 is provided with a pair of elongated, inwardly extending projections 38, 40 on the inner face thereof, which cooperatively define an elongated guide passage 42. The purpose of this passage 42 will be made clear hereinafter. The first handle means 22 is preferably in the form of an elongated lever 44 which is mounted for pivotal movement thereof about a horizontal axis on a pivot pin 46. As best seen in FIG. 2, the pin 46 is received within appropriate mounting apertures in the respective sidewalls 28, 30 of housing 20. The upper end of lever 44 extends through the slotted top wall 34, and is provided with a somewhat T-shaped handle 48 to facilitate fore and aft shifting of the lever 44 about the axis of pin 46.

The second handle means 24 is preferably in the form of a bail member 50 which is mounted for pivoting about a horizontal axis. To this end, the bail 50 is connected to an elongated pivot pin 52 which extends through the sidewall 28 of housing 20 and into the interior of the latter. Although not specifically shown, it will be understood that bail 50 extends transversely substantially the full width of handle 12, and is provided with a second pivot pin extending into the handle 12 at a point remote from the housing 20. As best seen in FIG. 1, the bail 50 includes an elongated grasping rod or portion 54 which is disposed adjacent the outermost end of handle 12 so that a user can conveniently grasp both handle 12 and portion 54 during normal operation of the mower.

The operating mechanism 26 is disposed within housing 20 and includes a sleeve-like coupler 56 (see FIG. 4) which is disposed about and shiftable along the length of the lever 44. The coupler 56 further includes a recessed portion adjacent one face of the lever which is defined in part by an arcuate engagement surface 58 which is important for purposes to be described. A biasing spring 60 is operatively coupled between the bottom wall 34 of housing 20 and the face of coupler 56 remote from the engagement surface 58. The spring 60 serves to bias the coupler 56 to its lowermost position illustrated in FIGS. 2, 3 and 4.

The mechanism 26 further includes an irregularly shaped operating plate 62 which is mounted for pivotal movement thereof on pin 52, so that bail 50 and plate 62 pivot in unison. The plate 62 includes an elongated operating finger 64 terminating in an engagement portion 66 located for engaging the underside of the coupler 56. In addition, the plate 62 is configured to present a shoulder 68 normally spaced above the finger 64, the purpose of which will be explained hereinafter.

Plate 62 is biased to the position thereof depicted in FIGS. 3 and 4 by means of a torsion spring 70 which engages the finger 64 and the internal housing for the adjacent bolt 36. As best seen in FIG. 3, the spring 70 further includes a coiled portion 72 which is disposed about a boss 74; the boss 74 is secured to plate 62, and receives the innermost end of pivot pin 52.

An elongated guide plate 76 is also located within housing 20 and forms a part of mechanism 26. Plate 76 is located in spaced relationship to the projections 38, 40 (see FIG. 2) and includes an elongated aperture 78 therethrough. The plate 76 is mounted on boss 74, and on the forward internal housing for the forward bolt 36. The aperture 78 includes an enlarged end portion 80 adjacent plate 36, the purpose of which will be explained.

The end of cable 14 within housing 20, and particularly metallic element 18, is provided with a metallic fitting 82. The fitting 82 includes a laterally extending projection 84, as well as a depending shoulder 86. The element 18 is secured to fitting 82 by means of a tubular connector 88 which is oriented adjacent the face of fitting 82 remote from projection 84. As best seen in FIG. 2, the connector 88 is located between the housing wall of projections 38, 40, whereas projection 84 is received within and reciprocates along the aperture 78 through guide plate 76. Thus, it will be perceived that the fitting 82, and thereby element 18 of cable 14, are guided for fore and aft reciprocation between the projections 38, 40, and plate 76.

As seen for example in FIG. 4, housing 20 is provided with an irregular aperture 90 therethrough adjacent the forward end thereof closest to the lawnmower motor. The cable 14 extends into aperture 90, and the casing 16 thereof is dead ended within the aperture by means of a metallic ferrule 92. A resilient, centrally apertured, shock-absorbing pad 94 is situated within aperture 90 adjacent the interior of housing 20. As can be seen, the metallic element 18 extends from the ferrule 92 through the aperture of pad 94 and is ultimately connected to fitting 82 by means of the connector 88.

The operation of control apparatus 10 will now be described, and particularly with reference to FIGS. 4-7, which illustrate an operation sequence.

Referring first to FIG. 4, the apparatus 10 is shown in a position wherein the bail 50 has been released, and the lawnmower clutch is disengaged, i.e., rotation of the lawnmower blade has ceased. In this position, it will be observed that the cable element 18 is shifted leftwardly with fitting 82 adjacent shock-absorbing pad 94. Also, the coupler 56 is in its lowermost position on lever 44, and plate 62 is located such that the portion 66 thereof is beneath the coupler.

Figure 5:
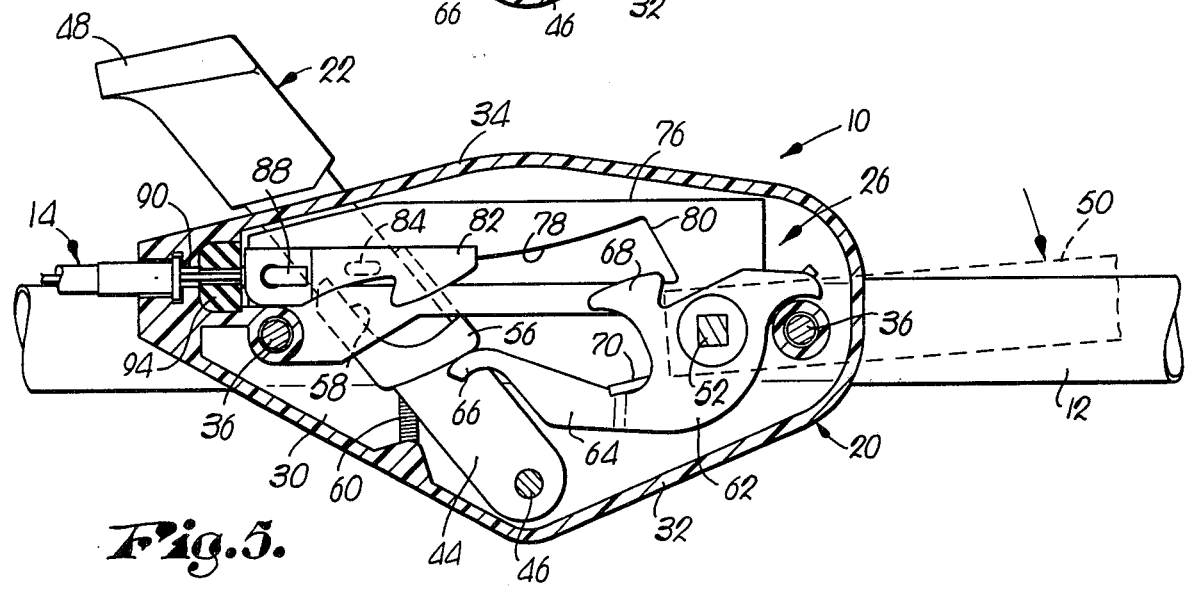
FIG. 5 is a view similar to that of FIG. 4, but illustrating the bail and operating mechanism in a shifted relation as compared with the FIG. 4 illustration.

The first step in restarting the mower blade involves pivoting of bail 50 about pin 52, or until the bail assumes the position depicted in FIG. 5 wherein the grasping portion 54 thereof is adjacent handle 12. Such pivoting of the bail 50 correspondingly pivots the operating plate 62 in a manner that the portion 66 shifts coupler 58 upwardly along the length of lever 44 until surface 58 is adjacent the fitting projection 84. It will be observed in this regard that such shifting of the coupler 56 is in opposition to biasing spring 60. Further, it will be seen that the user must maintain bail 50 in its operative position adjacent handle 12, else spring 60 will act to return coupler 56 to its original, lowered position.

Figure 6:
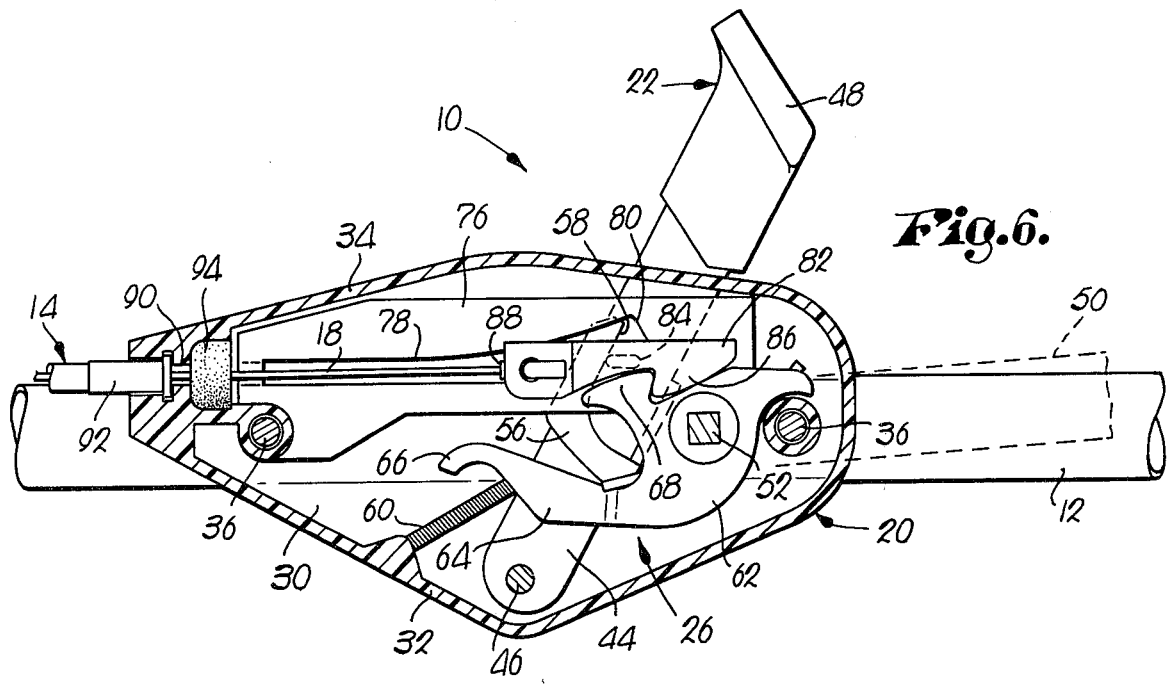
FIG. 6 is a view similar to that of FIGS. 4 and 5, but showing the operating lever in a shifted relation as compared with FIGS. 4 and 5.

Once the coupler 56 is positioned relative to projection 84, handle 48 is grasped and pulled rightwardly as viewed in FIGS. 5-6. This causes the surface 58 to come into engagement with projection 84 of fitting 82, so that the fitting 82, and thereby metallic element 18 of cable 14, is shifted rightwardly. Such rightward shifting is accommodated by virtue of aperture 78, and is guided for smooth action between plate 76 and the projections 38, 40.

At the end of the rightward travel of lever 44 (see FIG. 6) the shoulder 86 of fitting 82 rides up over the shoulder 68 of operating plate 62. Such action is accommodated by virtue of the enlarged end portion of aperture 78. In any event, the shoulder 86 thereafter passes over the rightward end of shoulder 68, such that the two shoulders interengage and lock. This serves to lock the element 18 in its extended, rightwardly shifted position which corresponds to engagement of the mower clutch. In this orientation, the mower blade is restarted and operable.

The lever 44 is next shifted back leftwardly to its original position (see FIG. 7), such being facilitated by means of spring 60. However, such return movement of the lever 44 does not alter the interlocked relationship of the shoulders 68, 86, and thus it will be appreciated that the mower clutch remains engaged. In this operational mode, the mower can be used in the normal fashion.

However, in the event that the user releases bail 50, the bail and plate 62 are caused to rotate in a counterclockwise manner as viewed in FIG. 7 under the influence of torsion spring 70. This in turn causes the shoulder 68 to be pivoted out of engagement with the shoulder 86. When this occurs, the element 18 (which is normally spring biased at the clutch) is allowed to shift leftwardly in order to rapidly disengage the clutch. This quickly stops the rotation of the mower blade. In order to restart the same, the two-step operation described above must be repeated.

I claim:

1. A power lawnmower control apparatus for connection to a disengageable clutch coupling the lawnmower motor and blade, said apparatus comprising:
   first shiftable handle means;
   second shiftable handle means;
   cable means for operative connection to said clutch including a first end portion adapted for connection to said clutch and a second end portion having structure for selective coupling and decoupling of the second end portion to said first handle means, said end portions shiftable between first and second positions respectively corresponding to the disengaged and engaged positions of said clutch; and
   operating mechanism, including
      coupling means selectively shiftable to a position coupling said first handle means and said second cable end portion for thereafter causing movement of said second cable end portion from said first to said second position thereof upon shifting of the first handle means; and
      structure associated with said second handle means for shifting of said coupling means to the coupling position thereof in response to shifting of said second handle means.

2. Apparatus as set forth in claim 1, including means for releasably locking said cable end portion in said second position thereof.

3. Apparatus as set forth in claim 2, said locking means comprising first and second interengageable shoulders respectively coupled with said cable end portion and said second handle means.

4. Apparatus as set forth in claim 3, including means biasing said second handle means to a position where said shoulders are disengaged, said second handle means including structure oriented for grasping by the operator of said lawnmower during cutting operations therewith in order to maintain said second handle means in a position where said shoulders are engaged.

5. Apparatus as set forth in claim 1, said coupling means comprising a projection carried by said cable end portion, and a projection-engaging element shiftably carried by said first handle means, said shifting structure including an elongated element-engaging finger coupled to said second handle means for engaging and sliding said element to said coupling position thereof in response to said shifting of said second handle means.

6. Apparatus as set forth in claim 5, including means biasing said element away from said coupling position thereof.

7. Apparatus as set forth in claim 5, said first handle means being elongated, said element being axially shiftable along the length of said first handle means.

8. Apparatus as set forth in claim 1, including a housing disposed about said mechanism.

* * * * *